No. 879,946.
PATENTED FEB. 25, 1908.
A. W. CORDES.
LOCKING DEVICE.
APPLICATION FILED SEPT. 6, 1907.
2 SHEETS—SHEET 1.
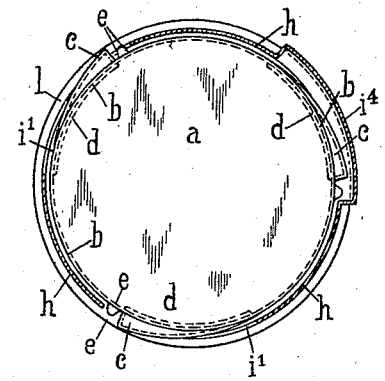
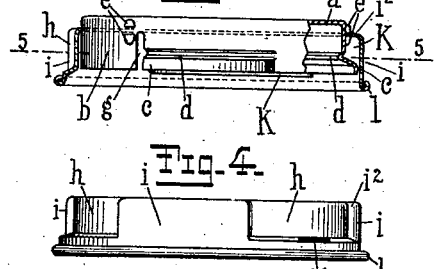
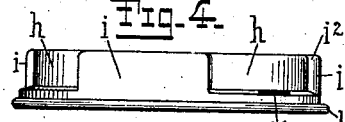
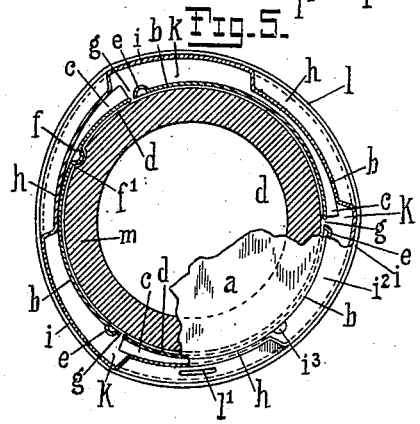
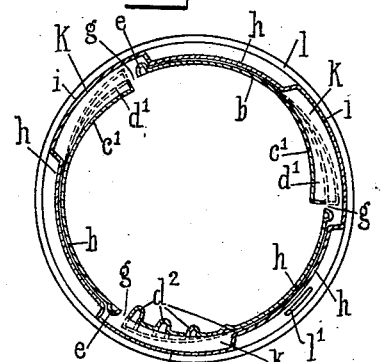
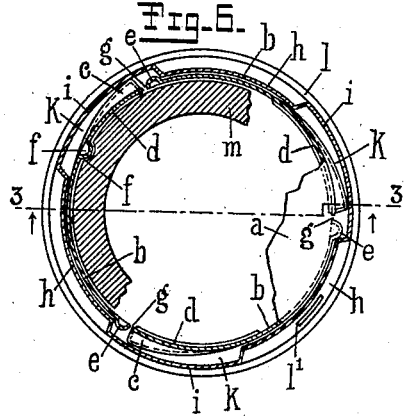
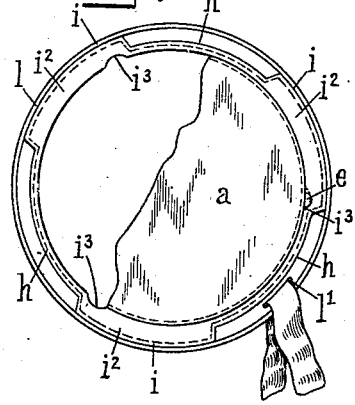
Witnesses:
G. V. Rasmussen
John Lotka
Inventor
AUGUST W. CORDES
By his Attorneys
Briesen & Knauth No. 879,946. PATENTED FEB. 25, 1908.
A. W. CORDES.
LOCKING DEVICE.
APPLICATION FILED SEPT. 6, 1907.
2 SHEETS—SHEET 2.
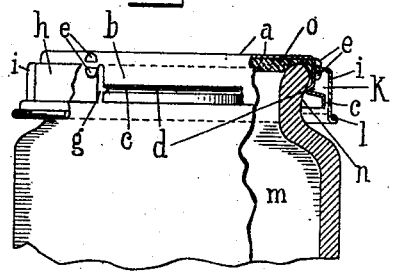
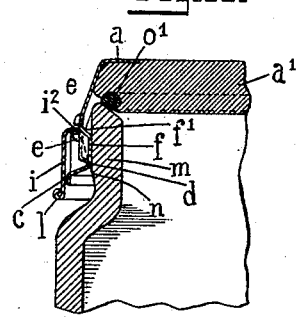
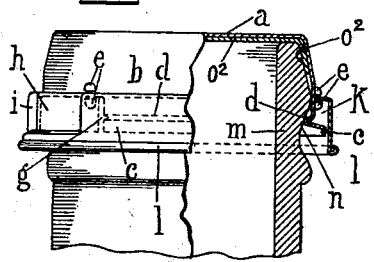
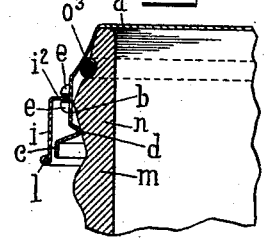
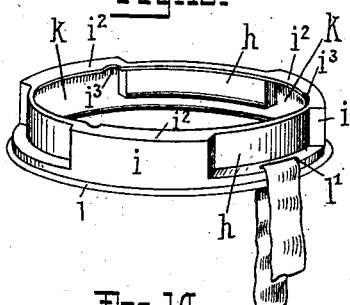
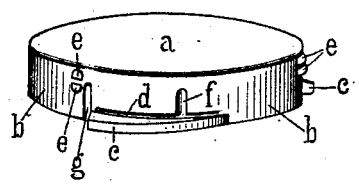
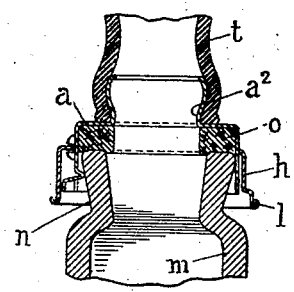
Witnesses:
G. V. Rasmussen
John Lotka
Inventor
AUGUST W. CORDES
By his Attorneys
Biesent Knauth

UNITED STATES PATENT OFFICE.

AUGUST WILHELM CORDES, OF BERLIN, GERMANY, ASSIGNOR TO FLORIAN WILLIAM STOCKER, OF HOBOKEN, NEW JERSEY.

LOCKING DEVICE.

No. 879,946.  Specification of Letters Patent.  Patented Feb. 25, 1908.

Application filed September 6, 1907. Serial No. 391,569.

*To all whom it may concern:*

Be it known that I, AUGUST WILHELM CORDES, a citizen of the United States, and a resident of Berlin, Germany, have invented certain new and useful Improvements in Locking Devices, of which the following is a specification.

My invention relates to locking devices, particularly for connecting two parts or members by rotation in one direction, and releasing them by rotation in the opposite direction; and this invention is especially adapted for use as a closure for bottles, jars and other receptacles, but may be employed as a coupling for various purposes. I have also devised novel means for applying such closures or couplings.

The invention will be fully described hereinafter, and the features of novelty pointed out in the appended claims.

Reference is to be had to the accompanying drawings, in which

Figure 1 is an elevation of a jar closure embodying one form of my invention. Fig. 2 is a horizontal section thereof, on line 2—2 of Fig. 1. Fig. 3 is an elevation, with parts in section on line 3—3 of Fig. 6, showing another form of my invention. Fig. 4 is an elevation of one of the members of the closure shown in Fig. 3. Fig. 5 is partly a plan view and partly a section on line 5—5 of Fig. 3, showing the parts in closed or locked position. Fig. 6 is a similar view, but shows the parts in open or released position. Fig. 7 is a corresponding top view, with parts broken away. Fig. 8 is a horizontal section showing another form of closure or cap. Figs. 9 to 12 inclusive, are partial elevations of jars having my improved closure applied thereto, said views illustrating different ways of obtaining a tight joint. Fig. 13 is a perspective view of one member of the locking device. Figs. 14 and 15 are perspective views showing two forms of the other member of the locking device. Fig. 16 is a vertical section illustrating the use of my invention as a coupling.

In each case, the locking device comprises two members capable of a restricted rotary movement, one relatively to the other. One of these members, which may be termed the clamping member, is adapted to be forced into firm engagement with the bottle or other article by turning the other member, which I will term the operating member.

In the forms of my invention illustrated by Figs. 1 to 7, the clamping member has a cylindrical portion $b$ and a closed top $a$. On the cylindrical portion $b$ I provide circumferential outwardly projecting cams $c$ and inward circumferential ribs or projections $d$ which may be concentric with the portion $b$, or eccentric thereto, and which correspond to the diameter of the engaged surface of the bottle. Furthermore, the cylindrical portion $b$ is provided with superposed slightly spaced guide lugs $e$, with slits $g$ by which it is divided into elastic segments, and with an inwardly projecting lug $f$, located above one of the ribs $d$ and in connection with it. The slits $g$ are located at those points where the cams $c$ project farthest outward. This clamping member is shown separately in Fig. 14.

The operating member of the construction illustrated by Figs. 3 to 7 is shown in perspective in Fig. 13, and is represented as open at the top, comprising segmental portions $h$ of a slightly larger diameter than the portion $b$ of the clamping member, intervening segmental outward projections $i$, which correspond to the cams $c$ in number, size and position, and transverse connecting portions $i^5$. These projections $i$ form pockets $k$ which are in this case open at the bottom, but closed at the top by parts of the continuous horizontal wall $i^2$, the inner edge of which fits between the guides $e$ of the clamping member, thus keeping the two members in their proper relative position and guiding the operating member in its movement. The wall $i^2$ may be provided with notches $i^3$ to facilitate passing or springing the operating member over the lugs $e$ of the clamping member, in the assembling of the parts. The inner edge of the horizontal wall $i^2$ is circular (except for the slight interruptions formed by the notches $i^3$) and, as clearly shown in Fig. 3, engages the cylindrical portion of the clamping member above the slits $g$, that is at a point where the clamping member is continuous and therefore practically inelastic. The upper guide lugs $e$ are located entirely above the level of the slits $g$, and preferably at least the upper or supporting surfaces of the lower guide lugs $e$ are also located at a higher level than the upper ends of the slits $g$, see Fig. 1. The lower edge $l$, of the clamping member may be milled and is preferably curled to stiffen it and to afford a better hold for the operator; the projecting portions $i$, $i^5$ also enable the operating member to be firmly gripped either by hand or by a tool.

The height of the clamping member is varied according to the packing which is to engage the mouth of the receptacle $m$. Fig. 9 shows a disk $o$ of cork or other material; in Fig. 10 a rubber ring $o'$ is employed in conjunction with a stopper member $a'$ fitted to the annular top $a$; in Fig. 11 the clamping member is strengthened against buckling by increasing its height above the slits $g$. The clamping member is made conical to correspond to the mouth of the bottle. A thin packing disk $o^2$ of paper, soft metal or the like is placed within the clamping member. This disk extends not only across the end surface of the bottle neck but also fits between the conical surfaces of the neck and clamping member, so as to insure a tight joint. In Fig. 12 a rubber ring $o^3$ engages the outer surface of the bottle neck and the inner surface of the clamping member, the top $a$ being in tight engagement with the mouth of the bottle, so that the liquid in the bottle may not reach the rubber ring.

The bottle or other article in connection with which my invention is used, should be provided with a surface $n$ flaring in the direction in which the locking device would tend to separate from the article. The bottle or other article may also be provided with one or more notches $f'$ (Figs. 5, 6 and 10) to receive the projection $f$, said notches being beveled or cam-shaped in the direction in which the operating member is turned to release it. However, the projection $f$ and notch $f'$ may be omitted.

The structure shown in Figs. 1 and 2 differs from that described above by having two of the cams $c$ arranged to project through segmental openings $i'$ of the operating member, while the third cam is received at times within a pocket $i^4$ having closed top and bottom walls.

Each of the members hereinbefore described may be made from sheet-metal by stamping and the two members are then assembled by registering the notches $i^3$ with the lugs $e$ and then forcing the operating member down, till the top $i^2$ is received between the guide lugs $e$, as indicated in Figs. 3 and 9 to 12. The two members are thus firmly connected, yet capable of rotation relatively to each other, such rotation being limited in one direction by the engagement of the lugs $e$ with the end walls $k^5$ of the pockets $k$ (see Fig. 6) or with the end walls of the openings $i'$ (Fig. 2). The rotation in the other direction is limited by the wedging action of the cams $c$ on the segmental portions $h$ (Fig. 5.)

The device is applied to the neck of the bottle or other receptacles in such a way that the projections or ribs $d$ will engage the flaring portion $n$ of the neck, the operating member and the clamping member being in what may be termed the released position (Figs. 2, 6 and also 8). By then turning the operating member to the holding or locking position (see Fig. 5), the clamping member is forced inward or radially against the bottle neck, on a large portion of its periphery by the action of the segments $h$ on the cams $c$, the contact with the bottle neck being along the ribs $d$. The lower part of the operating member is deformed elastically into a shape corresponding to the cams $c$, while the upper part $i^2$ remains unchanged as it cannot yield. At the same time an axial pressure (downward in Figs. 9 to 12) is exerted owing to the cam action of the flare $n$ on the ribs $d$. By turning the operating member in the opposite direction the locking device or closure is released. The projection $f$ and cam notch $f'$ will hold the clamping member firmly on the bottle or other article while the operating member is being turned to the locking position but may be dispensed with.

When the projection $f$ is used, the bevel shape of the recess $f'$ (Figs. 5 and 6) will facilitate turning the clamping member from the releasing position to a full release (contra-clockwise from the position Fig. 6); both members are then turned together owing to the engagement of the lower lugs $e$ with the end walls $i^5$ of the pockets $k$.

In the construction illustrated by Fig. 8, each cam $c'$ is practically of one piece with the corresponding rib $d'$ this latter being originally bent inward eccentrically and being adapted to be forced out to the position indicated by dotted lines, when the closure is applied to a bottle. The outer surfaces of these ribs then form cams similar in function to the cams $c$. At the lower portion of Fig. 8, I have shown a series of projections $d^2$ instead of the continuous rib $d'$, but the function of these parts is practically the same.

In order that tampering with the closure may be detected readily, the operating member may be provided with an opening or slit $l'$ between two of the projections $i$ for the reception of a band such as indicated in Figs. 7 and 13, to which a lead or other seal is attached, which is broken as soon as the operating member is turned to the released position; the band would be sealed to the bottle or to the clamping member.

The construction shown in Fig. 15 differs from that of Fig. 14 only by the fact that the lower lug $e$ extends to the bottom of the clamping member; the two lugs originally form one, which is produced at the same time that the said member is stamped out, and a horizontal groove is then made to produce two lugs as shown.

While the invention has been described chiefly in its application to bottle closures, it will be useful as a locking device generally, the locking and release being effected by partial rotation of the operating member. Thus Fig. 16 shows a construction very similar to Fig. 9, except that the top $a$ instead of being closed, is provided with a neck $a^2$ for connection with a rubber tube or nipple $t$.

I desire to call particular attention to the fact that the segmental portions $h$ of the operating member are spaced from the segmental portions $b$ of the clamping member (see Fig. 3), the spacing being effected by means of the top ring $i^2$. The object of this construction is to avoid unnecessary friction, since the clamping member will be engaged only at the cams $c$ and along the inner edge of the top $i^2$.

I claim as my invention:

1. A locking device comprising a clamping member having a cylindrical portion and peripheral cams projecting therefrom, and a rotatable operating member having a top ring the inner edge of which engages the clamping member, and segmental portions spaced from the cylindrical portion of the clamping member and arranged to engage the cams thereof.

2. A locking device comprising a clamping member having peripheral cams, and an operating member having an undeformable top and an elastically deformable lower portion arranged to engage said cams and to be deformed thereby while pressing them inward.

3. A locking device comprising a clamping member having a flat top, a conical portion adjacent thereto and a lower portion provided with peripheral cams, a packing disk located within said top and extending downward within said conical portion, and an operating member mounted to turn on the clamping member and arranged to force its cams inward.

4. A locking device comprising a clamping member having a top and a sleeve portion provided with peripheral cams, a packing disk located within said top and having its edge portion bent downward within the sleeve portion, and an operating member mounted to turn on the clamping member and arranged to force its cams inward.

5. A locking device comprising a clamping member adapted to engage the article to which said device is fitted and having a series of outwardly extending peripheral cams, and an operating member capable of turning relatively to the clamping member and provided with spaced segmental portions to engage said cams, and with free spaces between said portions to register with the cams and relieve them of pressure from the operating member.

6. A locking device comprising a clamping member adapted to engage the article to which said device is fitted and having a series of outwardly extending peripheral cams, and an operating member capable of turning relatively to the clamping member and provided with outward projections forming pockets for the reception of said cams, and also provided with engaging surfaces between said projections.

7. A locking device comprising a clamping member provided with eccentric peripheral projections on one of its surfaces and with concentric engaging portions on its other surface, the inner surface of said clamping member being adapted to engage the article to which the device is fitted, and an operating member capable of being turned relatively to the clamping member and arranged to force it against said article.

8. A locking device comprising a clamping member provided with eccentric projections on one of its surfaces and with concentric engaging portions on its other surface, each of said projections and the corresponding engaging portion being superposed, and an operating member capable of being turned relatively to the clamping member and arranged to engage the outer surface of the clamping member and to press the inner surface thereof against the article to which the device is fitted.

9. A locking device comprising a clamping member provided with eccentric outward projections at its lower edge, and with inner engaging portions above said projections, and an operating member mounted to turn on the clamping member and adapted to force said projections inward.

10. A locking device comprising a clamping member provided with superposed external guides, a continuous upper portion of substantially circular cross section, and elastic segments depending therefrom, and an operating member mounted to turn on the clamping member and provided with means to force it inward by a cam action, the upper portion of the operating member being bent inward to fit between said guides of the clamping member and having a substantially circular inner edge engaging the continuous upper portion of the clamping member, above the elastic segments.

11. A locking device comprising a clamping member having a segmental circumferential rib, forming a projecting edge on the inside and a cam surface on the outside, and an operating member mounted to turn on the clamping member and adapted to engage said cam surface.

12. A locking device comprising a clamping member and an operating member mounted to turn thereon and provided with means to force the clamping member inward by a cam action, the upper portion of the operating member being bent inward to space the body of said member from the body of the clamping member.

13. A locking device comprising a clamping member provided with a continuous upper portion of substantially circular cross section, elastic segments depending therefrom, and superposed external guides of which the upper ones are located on said upper portion at a level above the upper ends of the depending segments, and an operating member mounted to turn on the clamping member and provided with means to force said segments inward by a cam action, the upper portion of the operating member being bent inward to fit between the guides of the clamping member.

14. A locking device comprising a clamping member provided on its outer surface with superposed guides and with eccentric outward projections, and an operating member mounted to turn on the clamping member and having portions to force said projections inward, said operating member also having pockets between said portions to receive the eccentric projections, and with an upper portion bent inward to fit between said guides, one of the latter being adapted to engage the end of the pocket and thus limit the movement of the operating member.

15. A locking device comprising a clamping member and an operating member mounted to turn thereon and constructed to press it inward, said operating member being provided with a slit to receive a seal to be broken upon the release of the clamping member.

16. A locking device comprising a clamping member having a lug adapted to enter a recess of the article on which the device is fitted, and a cam portion on which said lug is situated, and an operating member mounted to turn on said clamping member and constructed to force said cam portion and lug inward.

17. A locking device comprising a clamping member having a lug adapted to enter a recess of the article on which the device is fitted, and a cam portion on which said lug is situated, and an operating member mounted to turn on said clamping member and having a pocket to receive said cam portion and provided at one side of said pocket with an engaging portion constructed to force the cam portion and lug inward.

In testimony whereof, I have hereunto set my hand in presence of two witnesses.

Dated, New York, August 29th 1907.

AUGUST WILHELM CORDES.

Witnesses:
    JOHN LOTKA,
    EUGENE EBLE.